United States Patent [11] 3,566,139

[72] Inventors John W. Hardy
Lexington;
Donald C. Redpath, Winchester, Mass.
[21] Appl. No. 691,536
[22] Filed Dec. 18, 1967
[45] Patented Feb. 23, 1971
[73] Assignee Itek Corporation
Lexington, Mass.

[54] SYSTEM FOR COMPARING DETAIL IN A PAIR OF SIMILAR OBJECTS
51 Claims, 32 Drawing Figs.

[52] U.S. Cl. .......... 250/220, 356/2
[51] Int. Cl. .......... G01c 11/12, H01j 39/12
[50] Field of Search .......... 178/6.5; 250/220 (SP); 356/2

[56] References Cited
UNITED STATES PATENTS
2,964,642 12/1960 Holbrough .......... 250/220SP
3,145,303 7/1964 Holbrough .......... 250/220SP
3,267,286 7/1966 Bailey et al. .......... 250/220SP

*Primary Examiner*—Robert L. Griffin
*Assistant Examiner*—Donald E. Stout
*Attorneys*—Homer O. Blair, Robert L. Nathans, Lester S. Grodberg and John E. Toupal

ABSTRACT: An image correlation system which produces vector error signals comprising error signal components corresponding to relative image detail misregistration along related nonparallel paths in each of the images being correlated. The vector error signals represent two-dimensional types of image detail misregistration and can control optical components to produce registration of the compared images. A pair of image storing electronic cameras having different rasters formed by nonintersecting scanning lines generate separate video signals for each compared image. The different scanning patterns permit a comprehensive comparison of the images while preventing the generation of undesirable video components caused by scanning line intersections.

Inventors:
John W. Hardy,
Donald C. Redpath,
by John E. Toupal
Attorney

Inventors:
John W. Hardy,
Donald C. Redpath,
by John E. Toupal
Attorney

Inventors:
John W. Hardy,
Donald C. Redpath,
by John E. Toupal Attorney

Inventors:
John W. Hardy,
Donald C. Redpath,
by John E. Toupal
Attorney

Inventors:
John W. Hardy,
Donald C. Redpath,
by John E. Toupal
Attorney

Inventors:
John W. Hardy,
Donald C. Redpath,
by John E. Tempel Attorney

Inventors:
John W. Hardy,
Donald C. Redpath,
by John E. Toupal
Attorney

Inventors:
John W. Hardy,
Donald C. Redpath,
by John E. Toupal Attorney

Inventors:
John W. Hardy,
Donald C. Redpath,
by John E. Toupal Attorney

Inventors:
John W. Hardy,
Donald C. Redpath,
by John E. Toupal
Attorney

SYSTEM FOR COMPARING DETAIL IN A PAIR OF SIMILAR OBJECTS

This invention relates generally to a method and apparatus for comparing and measuring the correspondence in detail between similar images and, more specifically, relates to an apparatus for measuring the degree of misregistration between stereo photographs.

Although not so limited, the present invention is particularly well suited for use in the production of topographic maps having contour lines representing points of equal elevation. Typically, maps of this type are obtained from stereoscopically related photographs taken from airplanes. When such photographs are accurately positioned in locations corresponding to the relative positions in which they were taken, their projection upon a suitable base can produce for an observer a three-dimensional presentation of the particular terrain imaged on the photographs.

Generally, because of practical flight photography limitations, the stereo photographs do not possess images of exactly corresponding surface areas. For this reason, a coherent stereo presentation is obtained only if the photographs are properly registered, i.e. so positioned that homologous areas in the two projections are aligned and have the same orientation. The problem of registration is accentuated by the fact that, typically, the image detail in the photographs is not identical in all respects. Detail nonuniformity is caused, for example, by photographing a given scene from the different camera viewpoints produced by variations in altitude, roll and pitch of the photographic aircraft. The resultant separation between corresponding points in the projected images is known as parallax. A rather detailed description of various types and degrees of parallax which can exist in stereophotographs appears in U.S. Application Ser. No. 394,502 "Photographic Image Registration" filed Sept. 4, 1964 and assigned to the assignee of the present application. Elimination of parallax requires intricate adjustment of the projected images relative to each other so as to establish exact registration of homologous image detail.

After attaining image registration, an observer is able to recognize points of equal elevation and to mark such points in the well-known manner with continuous contour lines. However, recognition of parallax and its correction by manual registration techniques is a particularly slow and difficult operation requiring extreme concentration by highly skilled craftsman. In addition, the work periods of such craftsman must necessarily be short because of the intense visual fatigue resulting from the tedious operation.

Several rather complex stereo viewer systems have been devised to assist photogrammeters in performing the difficult tasks of image registration. Most such systems have employed flying spot scanners and image dissector tubes for analyzing images of the stereo photographs being compared. The primary disadvantages of these viewers is that the various electronic viewing tubes provide reproduced images having less than satisfactory optical qualities. Another disadvantage results from the flying spot scanner requirement for an optical duplexing system in which the scanning light and viewing light occupy different parts of the spectrum, and travel through the optical system in opposite directions. This requirement substantially complicates and increases the equipment costs of the system. In addition, image dissector tubes require extremely high light intensities.

The object of this invention, therefore, is to provide an improved correlation system for comparing corresponding detail retained by related scenes. A more specific object of this invention is to provide such a system specifically suited for use in determining parallax existing between the stereo photographs used in the field of photogrammetery.

One feature of this invention is the provision of an image correlation system of the type which generates video signals representing variable detail along a given path in one optical image and along a similar path in an additional optical image and compares the video signals and produces parallax error signals indicating misregistration between common image detail along the given and similar path; and including an analyzer circuit which analyzes the parallax error signals and produces vector error signals each comprising error signal components corresponding to relative image detail misregistration between the optical images along nonparallel paths therein. The vector error signals produced represent types of two dimensional image detail misregistration between the compared optical images rather than the one dimensional types represented by the error signals produced in previous image correlation systems. These unique two-dimensional or vector error signals make it possible to reduce relative distortion between the compared images with adjustable optical components directly controlled by the vector signals. Such optical components are capable of producing transformed actual images possessing an optical quality superior to that of the reproduced images generated by the electronic viewers utilized in previous correlation systems.

Another feature of this invention is the provision of an image correlation system of the above-featured type wherein the nonparallel paths terminate and are thereby defined by Cartesian coordinate axes within each of the compared optical images. The Cartesian coordinate axes provide image boundaries which simplify extraction from the video signals of error signal components suitable for combination into desired vector error signals.

Another feature of this invention is the provision of an image correlation system of the above featured type wherein the nonparallel paths include paths forming obtuse angles with the inner portions of the boundary axes. The error signal components corresponding to relative image detail misregistration along these paths can be suitably combined to provide vector error signals representing either relative skew or relative magnification distortion between the compared images.

Another feature of this invention is the provision of an image correlation system of the above-featured type wherein the nonparallel paths further include paths forming acute angles with the inner portions of the boundary axes. The error signal components corresponding to relative image detail misregistration along these paths can be selectively combined to provide vector error signals representing either relative differential scale or relative rotation distortion between the compared images.

Another feature of this invention is the provision of an image correlation system of the above featured type wherein the vector error signals include a signal corresponding to the average degree and sense of relative image detail misregistration along the obtusely angled paths in directions away from the adjacent axes in one set of diagonal quadrants of the Cartesian system, and in directions toward the adjacent axes in the other set of diagonal quadrants thereof. This vector error signal represents the degree and sense of average skew distortion existing between the compared optical images.

Another feature of this invention is the provision of an image correlation system of the above-featured type wherein the vector error signals include a signal corresponding to the average degree and sense of relative image detail misregistration along the obtusely angled paths in directions away from the adjacent axes in all quadrants of the Cartesian system. This vector error signal represents the degree and sense of average magnification distortion existing between the compared optical images.

Another feature of this invention is the provision of an image correlation system of the above-featured type wherein the vector error signals include a signal corresponding to the average degree and sense of relative image detail misregistration in directions toward one coordinate axis along the acutely angled paths in one set of diagonal quadrants of the Cartesian system, and in directions toward the other coordinate axis along the acutely angled paths in the other set of diagonal quadrants thereof. This vector error signal represents the degree and sense of average rotation distortion existing between the compared optical images.

Another feature of this invention is the provision of an image correlation system of the above-featured type wherein the vector error signals include a signal corresponding to the average degree and sense of relative image detail misregistration along the acutely angled paths in directions toward the same coordinate axis in all quadrants of the Cartesian system. This vector error signal represents the degree and sense of differential scale distortion existing between the compared optical images.

Another feature of this invention is the provision of an image correlation system of the above-featured type including an adjustable magnification lens controlled by the magnification error signal so as to reduce the degree of relative image distortion represented thereby, and an image rotator device controlled by the rotation error signal to reduce the degree of relative image distortion represented thereby.

Another feature of this invention is the provision of an image correlation system wherein optical images of scenes being compared are received by image storing electronic cameras which provide video signals representing the light intensity in scanned portions of the received images. By comparing and correlating the video signals produced by the electronic cameras, one can obtain an output signal indicative of nonuniformities existing in the simultaneously scanned portions of the images. Because image storage tubes have approximately the same sensitivity as the human eye, the same light source can be used for both the viewing and correlation operations thereby simplifying the stereo viewer equipment requirements. Furthermore, the image storage tubes have the capability of correlating color material.

Another feature of this invention is the provision of an image correlation system of the above-featured type including one optical system which produces first and second optical images of one scene and an additional optical system which produces first and second optical images of an additional related scene. An image storing camera tube receives each of the four images and produces video signals representative thereof. Correlation of the video signals is made in a comparison circuit which provides one output signal derived by comparing the signals representing the first optical images and an additional output signal derived by comparing the signals representing the second optical images. A raster generator produces one scanning pattern for the storage tubes receiving the first optical images and a different scanning pattern for the tubes receiving the second optical images. By scanning both of the image sets with a pair of different scanning patterns each formed by nonintersecting scanning lines, one can obtain a comprehensive comparison of the related scenes while eliminating undesirable video output components caused by nonuniform storage tube exposure periods.

Another feature of this invention is the provision of an image correlation system of the above-featured type wherein the nonintersecting scanning lines are substantially parallel and the lines in one pattern scan image portions transversely related to the portions scanned by the different pattern. These scanning patterns are particularly effective for producing video output signals suitable for image correlation.

Another feature of this invention is the provision of an image correlation system of the above-featured types wherein the one output signal provided by the comparison circuit indicates both the magnitude and sense of phase shift existing between the video signals representing the first optical images and the additional output signal indicates both the magnitude and sense of phase shift existing between the video signals representing the second optical images. By suitably correlating the output signals produced by the comparison circuit with the reference signals generated by the raster generator, one can obtain output voltages representing both the magnitude and sense of various types of distortion existing between the compared scenes.

Another feature of this invention is the provision of an image correlation system of the above-featured type wherein the scanning lines in each of the different scanning patterns comprise diagonal lines which scan in opposite directions. During correlation of the video signals produced by this form of scan, a desirable cancellation of signal noise is obtained.

Another feature of this invention is the provision of an image correlation system of the above-featured type wherein the comparison circuit includes a primary correlator adapted to invert the sense of the one output signal during periods wherein the scanning beams in the one scanning patterns scan in one of the opposite directions and to invert the sense of the additional output signal during periods wherein the beams in the different scanning patterns scan in one of the opposite direction. This correlation of output signals compensates for the opposite directions of scan and produces one parallax signal indicative of existing parallax in one of the diagonal scanning directions and an additional parallax signal indicative of the existing parallax in the other diagonal scanning direction.

Another feature of this invention is the provision of an image correlation system of the above-featured type wherein the comparison circuit also includes an $x$ parallax correlator which combines the two parallax signals to provide an $x$ parallax output signal representing the composite image detail misregistration existing in a direction corresponding to a given coordinate axis of the scanning patterns.

Another feature of this invention is the provision of an image correlation system of the above-featured type wherein the comparison circuit includes a $y$ parallax correlator which inverts the sense of one of the parallax signals and combines the inverted signal with the other parallax signal to provide a $y$ parallax output signal representing composite parallax in the other coordinate direction of the scanning patterns.

Another feature of this invention is the provision of an image correlation system of the above-featured type wherein the comparison circuit includes magnification and skew distortion correlators which invert the sense of the one parallax signal during periods wherein the scanning beams producing the one scanning patterns are in either the first or third coordinate quadrant portions thereof, block that parallax signal during periods wherein the scanning beams are in the second and fourth quadrant portions thereof, invert the sense of the additional parallax signal during periods wherein the scanning beams producing the different scanning patterns are in either the second or fourth quadrant portions thereof, and block the additional parallax signal during periods wherein the scanning beams producing the different scanning patterns are in the first and third quadrant portions thereof. Selective combination of these correlated signals provides output signals indicative of both the magnitude and sense of magnification and relative skew error existing between the compared images.

Another feature of this invention is the provision of an image correlation system of the above-featured types wherein the comparison circuit also includes rotation and differential scale correlators which invert the sense of the one parallax signal during periods wherein the scanning beams producing the one scanning patterns are in either the second or fourth coordinate quadrant portions thereof, block the one parallax signal during periods wherein the scanning beams are in the first and third quadrant portions thereof, invert the sense of the additional parallax signal during periods wherein the scanning beams producing the different scanning patterns are in either the first or third quadrant portions thereof, and block the additional parallax signal during periods wherein the scanning beams are in the second and fourth quadrant portions thereof. Selective combination of these correlated signals produces output signals representing both the magnitude and sense of rotation and differential scale distortion existing between the compared images.

Another feature of this invention is the provision of an image correlation system of the above-featured type wherein the raster generator produces reference signals adapted to provide crossed diagonal scan patterns for each of the image storage cameras and includes one blanking circuit associated with the cameras receiving the first optical images and an additional blanking circuit associated with the cameras receiving the second optical images. The one blanking circuit is adapted to blank those portions of the reference signals which would produce scanning lines in one diagonal direction and the additional blanking circuit blanks those portions of the reference signals which would produce scanning lines in the other diagonal direction. This arrangement produces in a relatively simple and efficient manner the desired pair of different scanning patterns.

Another feature of this invention is the provision of an image correlation system of the type featured in the eighth paragraph above wherein the one scanning pattern is formed by substantially vertical scanning lines having a single common direction of scan. These scanning patterns simplify the correlative operations required to obtain signals directly representing the various types of existing distortion.

Another feature of this invention is the provision of an image correlation system of the above featured type wherein the comparison circuit includes an $x$ scale correlator which inverts the sense of the one output signal only during periods wherein the scanning beams producing the one scanning pattern are in one of the horizontal halves thereof. The output of the $x$ scale correlator represents both the magnitude and sense of $x$ scale distortion existing between the compared images.

Another feature of this invention is the provision of an image correlation system of the above-featured type wherein the comparison circuit also includes an $x$ skew correlator which inverts the sense of the one output signal only during periods wherein the scanning beams producing the one scanning pattern are in one of the vertical halves thereof. The output of the $x$ skew correlator is indicative of both the magnitude and sense of $x$ skew error existing between the compared images.

Another feature of this invention is the provision of an image correlation system of the above featured type wherein the comparison circuit further includes a $y$ scale correlator which inverts the sense of the additional output signal only during periods wherein the scanning beams producing the different scanning pattern are in one of the vertical halves thereof. The output of the $y$ scale correlator represents both the magnitude and sense of $y$ scale error existing between the compared images.

Another feature of this invention is the provision of an image correlation system of the above-featured type wherein the comparison circuit comprises a $y$ skew correlator which inverts the sense of the additional output signal only during periods wherein the scanning beams producing the different scanning pattern are in one of the horizontal halves thereof. The output of the $y$ skew correlator directly represents both the magnitude and sense of $y$ skew error existing between the compared images.

These and other features and objects of the present invention will become more apparent upon a perusal of the following specification taken in conjunction with the accompanying drawings wherein.

Figure 1:
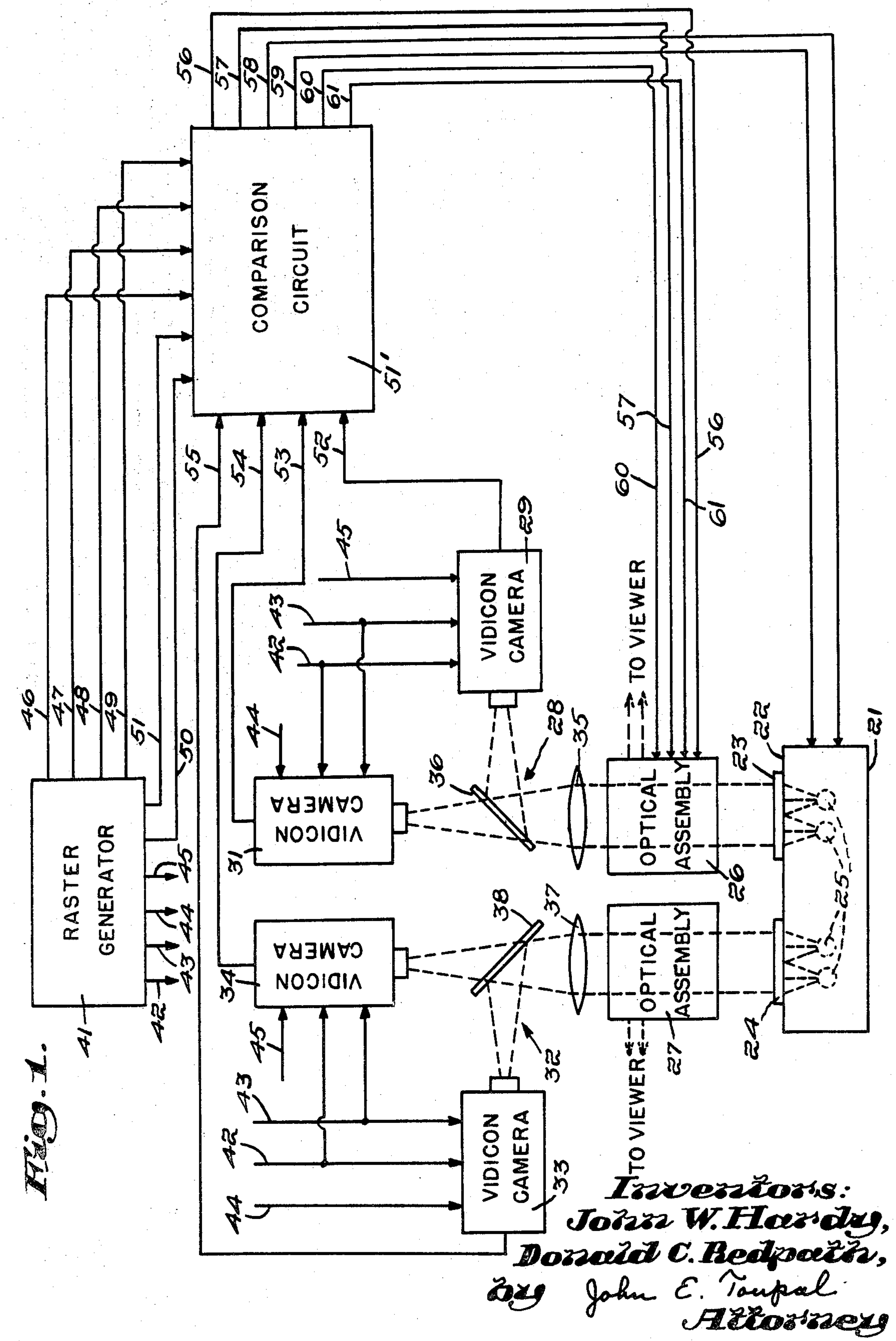
FIG. 1 is a general block diagram illustrating the functional interrelationship between the main components of one system embodiment of the invention.
Figure 4:
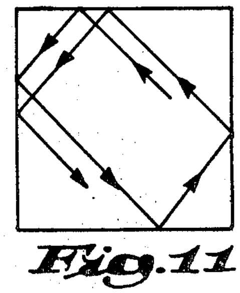
Figure 5:
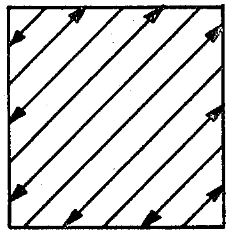
Figure 6:
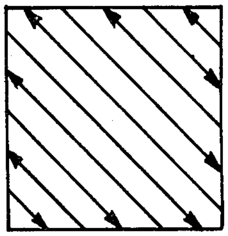
Figure 8:
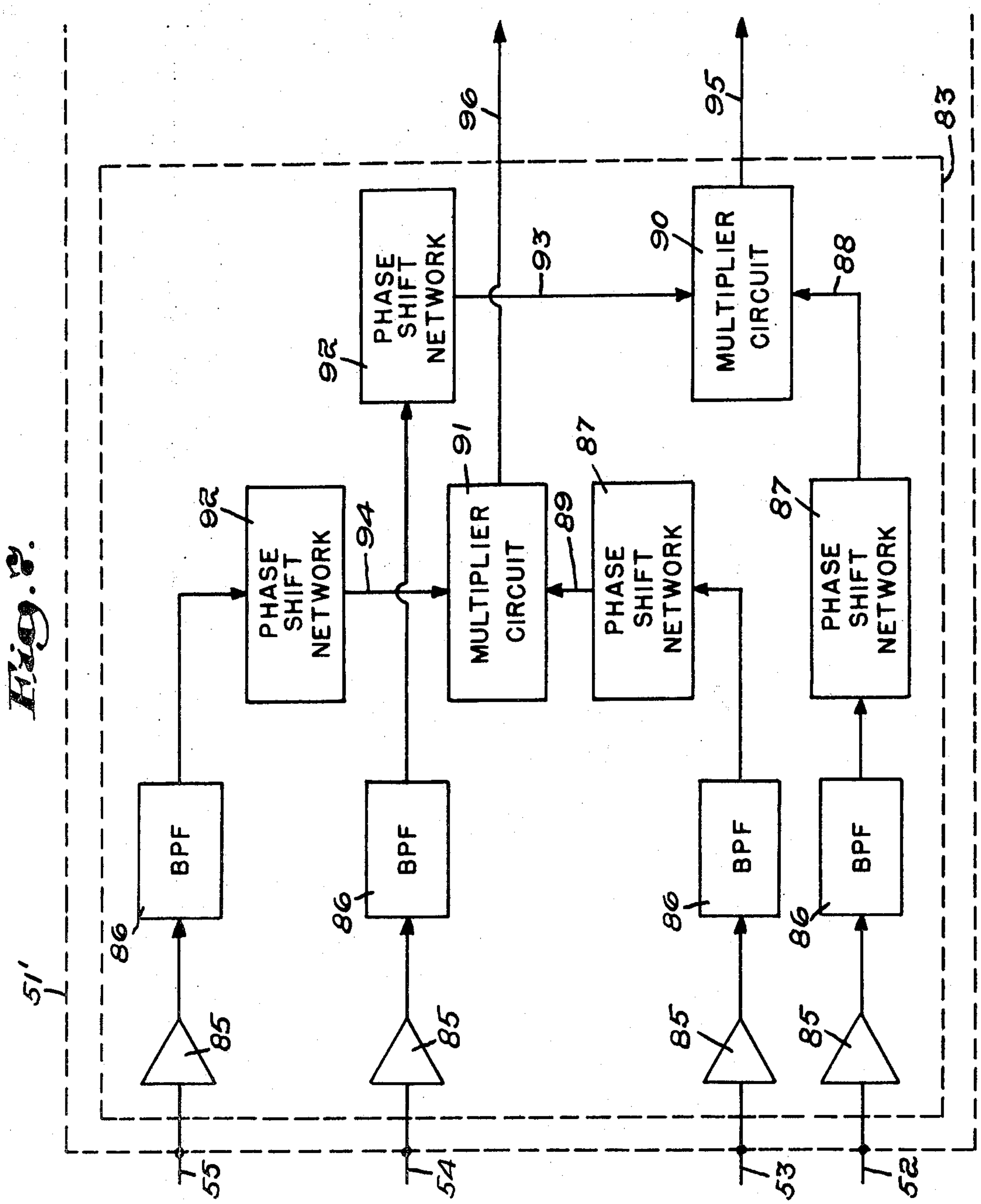
Figure 3A:
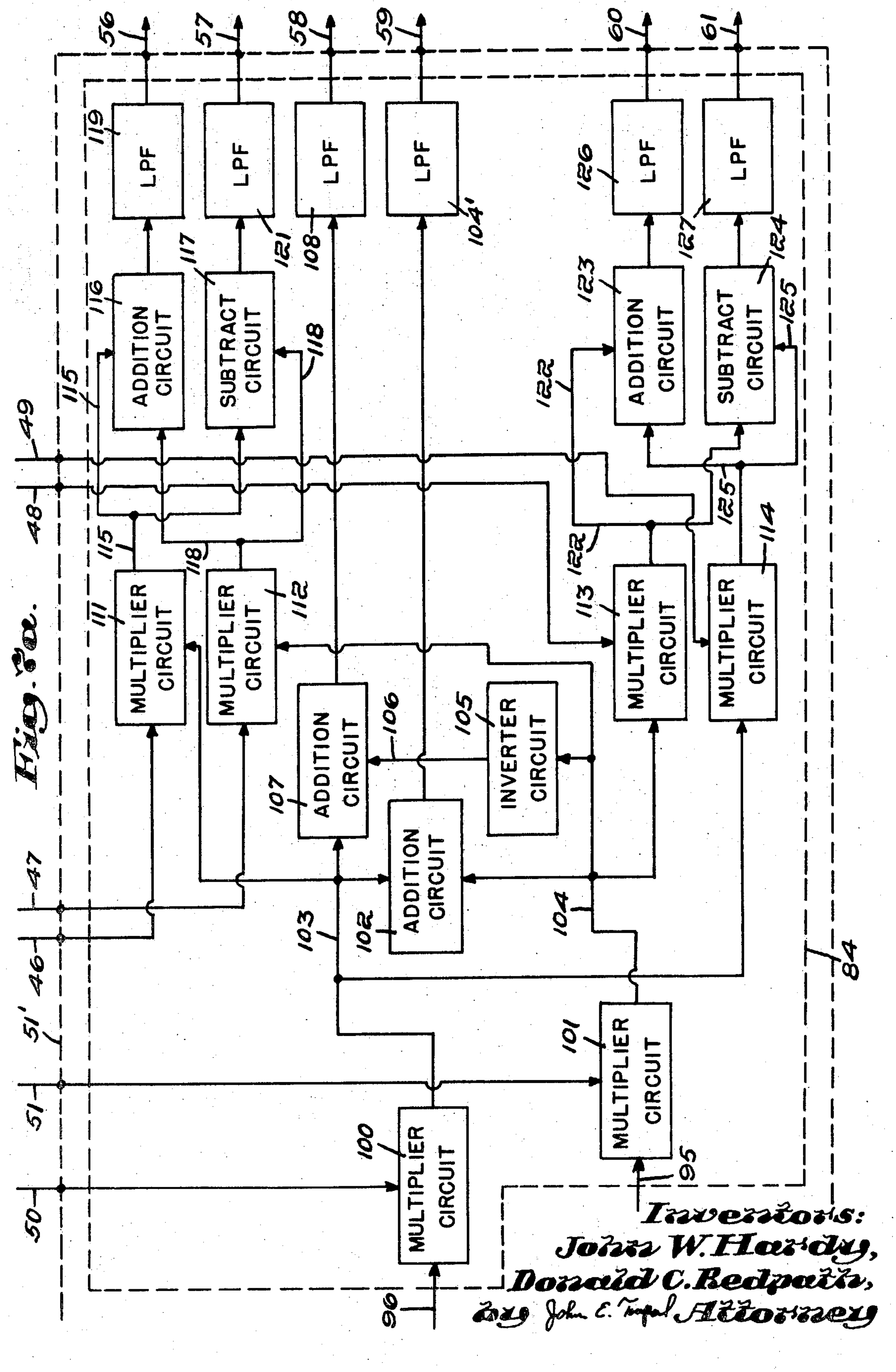
Figure 10:
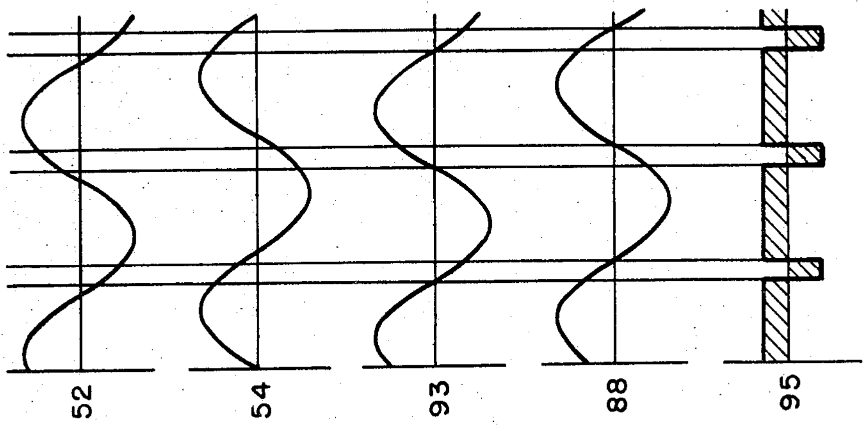
Figure 9:
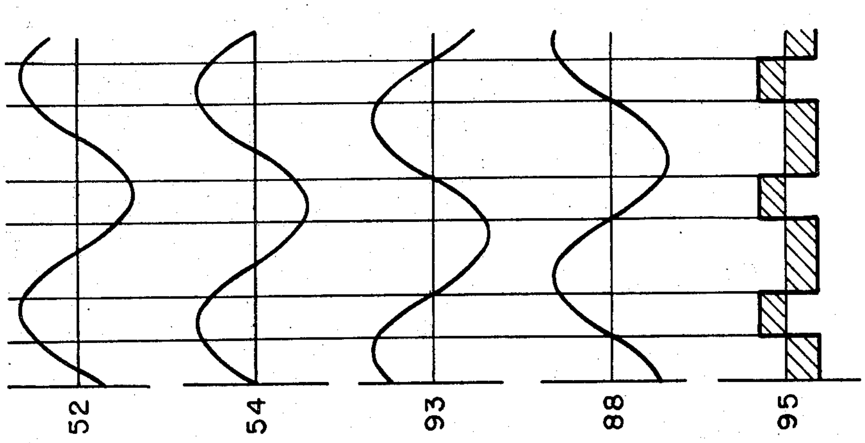
Figure 8:
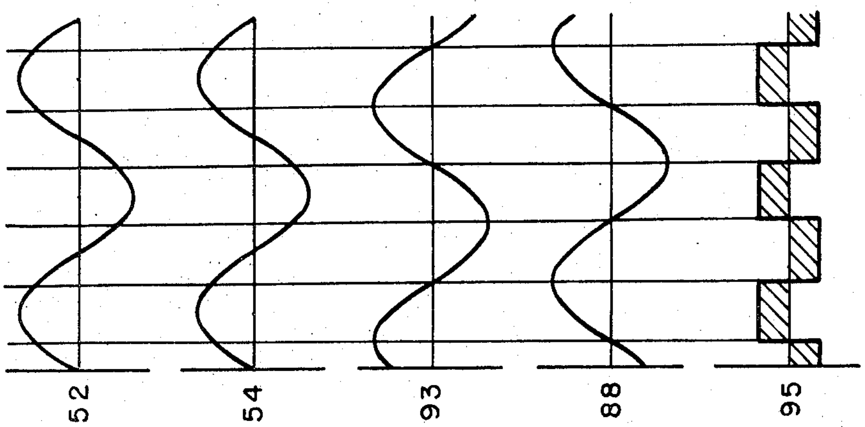

FIGS. 4—6 are diagrammatic views illustrating the character of the paths followed by the scanning spots on the targets of the vidicon cameras shown in FIG. 1;

FIGS. 7 and 7*a* are block diagrams illustrating the comparison circuit shown in FIG. 1;

FIGS. 8—10 are graphs showing waveforms generated in the comparison circuit of FIGS. 7 and 7*a* under various conditions;

FIGS. 11—21 are diagrammatic views illustrating various correlative operations produced in the comparison circuit of FIGS. 7 and 7*a;*

Figure 22:
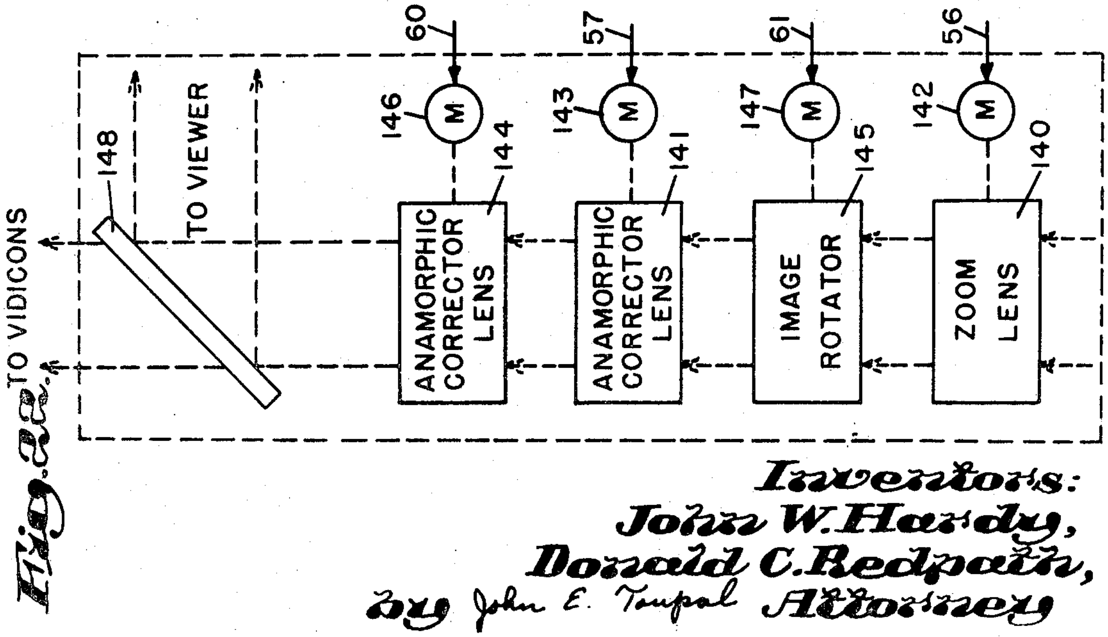
Figure 23:
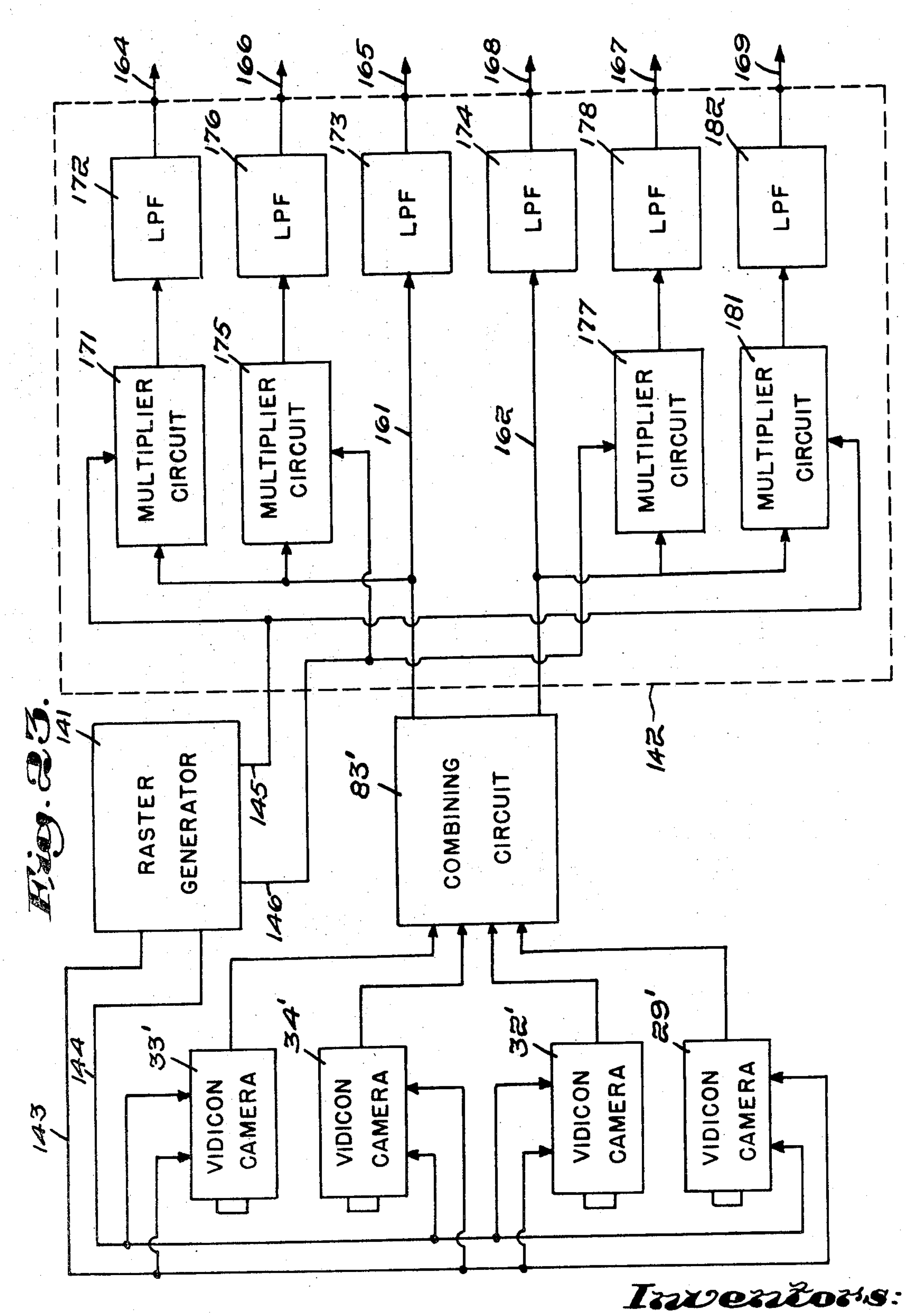
Figure 24:
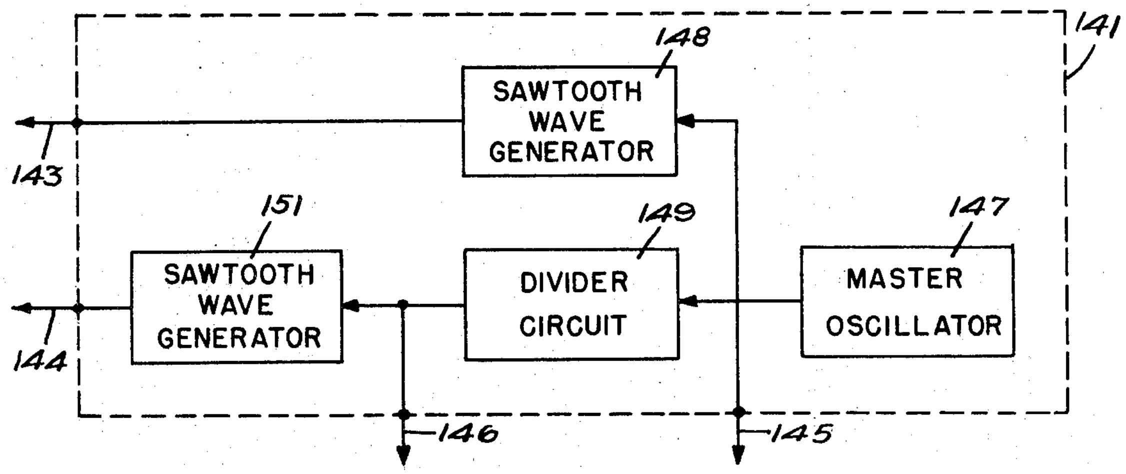

FIG. 22 is a block diagram of one of the optical assemblies shown in FIG. 1;

FIG. 23 is a block diagram of another system embodiment of the invention;

FIG. 24 is a block diagram of the raster generator shown in FIG. 23.

Figure 25:
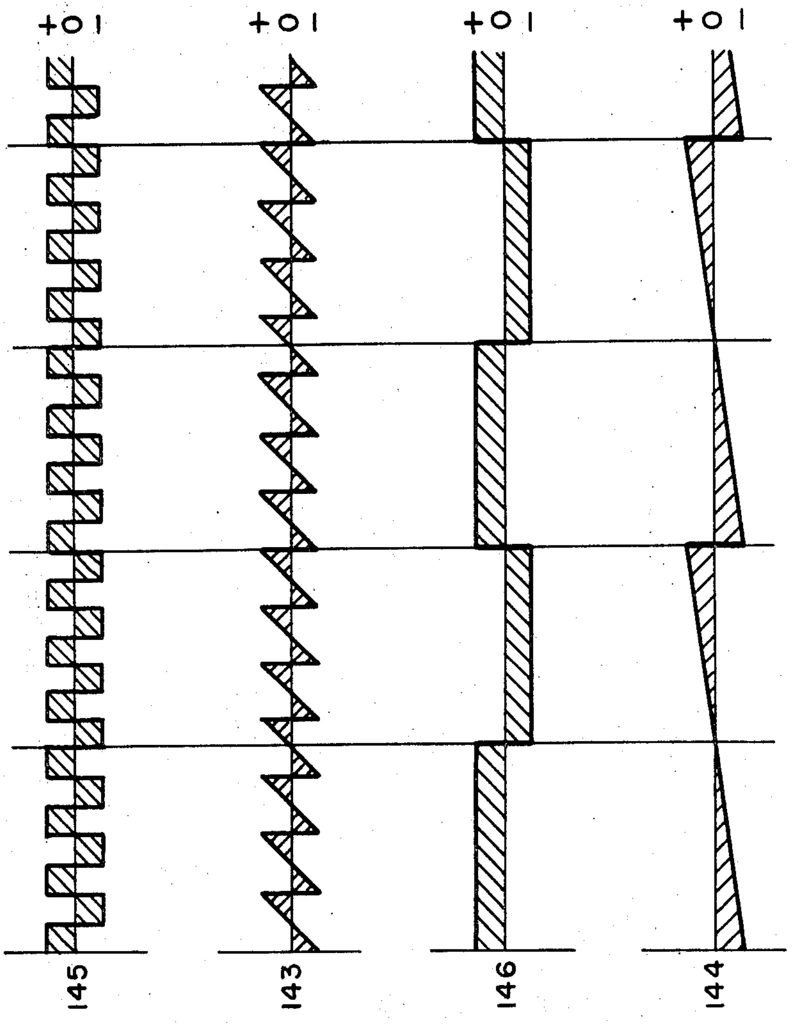

FIG. 25 is a graph showing a plurality of waveforms produced in the raster generator of FIG. 24.

Figure 26:
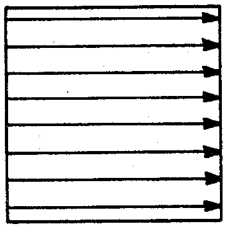
Figure 27:
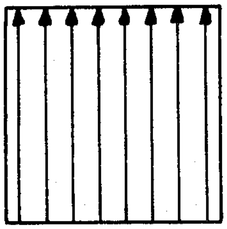
Figure 28:
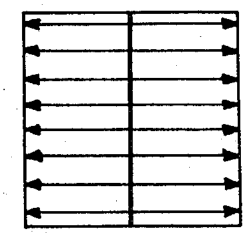
Figure 29:
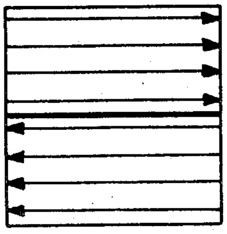
Figure 30:
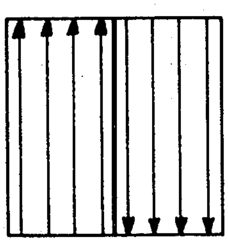
Figure 31:
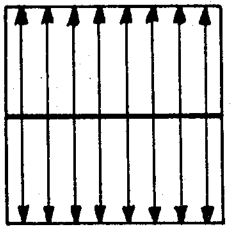

FIGS. 26 and 27 are diagrammatic views illustrating the character of the paths followed by the scanning spots in the system embodiment illustrated in FIG. 23; and FIGS. 28—31 are diagrammatic views illustrating various correlative operations produced in the system of FIG. 23.

Referring now to FIG. 1 there is shown the transport table 21 having a transparent top 22 which supports the right and left stereophotographic transparencies 23 and 24. Positioned below the table top 22 are the light sources 25 which direct light through the transparencies 23 and 24 producing optical images of the scenes retained thereby. These optical images are received and directed by the optical assemblies 26 and 27 toward the eyepieces of a conventional binocular viewer (not shown).

One optical system 28 receives from the assembly 26 the optical image of the scene retained by the right transparency 23 while the additional optical system 32 receives the optical image of the scene retained by the left transparency 24. The optical system 28 includes a lens 35 and beam splitter 36 which separates the right optical image into identical first and second images received, respectively, by the vidicon cameras 29 and 31. Likewise, the optical system 32 includes a lens 37 and beam splitter 38 which separates the left optical image into first and second identical images received, respectively, by the vidicon cameras 33 and 34.

The raster generator 41 generates on signal lines 42 and 43 $x$ and $y$ deflection voltages which are applied to each of the vidicon cameras 29 and 31, 33 and 34. Also generated by the raster generator 41 on the signal line 44 is one deflection blanking signal which is applied to the vidicon cameras 31 and 33. An additional deflection blanking signal is produced by the raster generator 41 on the signal line 45 and applied to the vidicon cameras 29 and 34. The raster generator 41 also produces on lines 46—51 reference signals which together with the video output signals provided by the vidicon cameras on lines 52—55 are applied to the comparison circuit 51'. In response to these input signals the comparison circuit produces on signal lines 56—61 output control voltages which are applied to the transport table 21 and to the optical assembly 26.

During operation of the system, the pair of stereophotographic transparencies 23 and 24 are positioned on the transport table 21 and the light sources 25 energized to produce optical images. These images are received both by the binocular viewer (not shown) and by the vidicon cameras 29, 31, 33 and 34 after being split by the beam splitters 36 and 38. As controlled by the deflection signals on lines 42 and 43 and the blanking signals on the lines 44 and 45, the scanning beams in the vidicon cameras 29, 31, 33 and 34 scan related portions of the optical images received. The beams produce video signals on the output lines 52—55 representing the light intensity along the particular image paths being scanned. A comparative analysis of both the video and correlation signals is made by the comparison circuit 51' which produces output voltages on the lines 56—61 representing various types of image detail misregistration existing in the images of the transparencies 23 and 24. These voltages are used to provide image registration by altering the optical characteristics of the assembly 26 and by producing relative movement between the transparencies themselves. A further explanation regarding the makeup and operation of the comparison circuit 51' and the raster generator 41 appears below.

Figure 2:
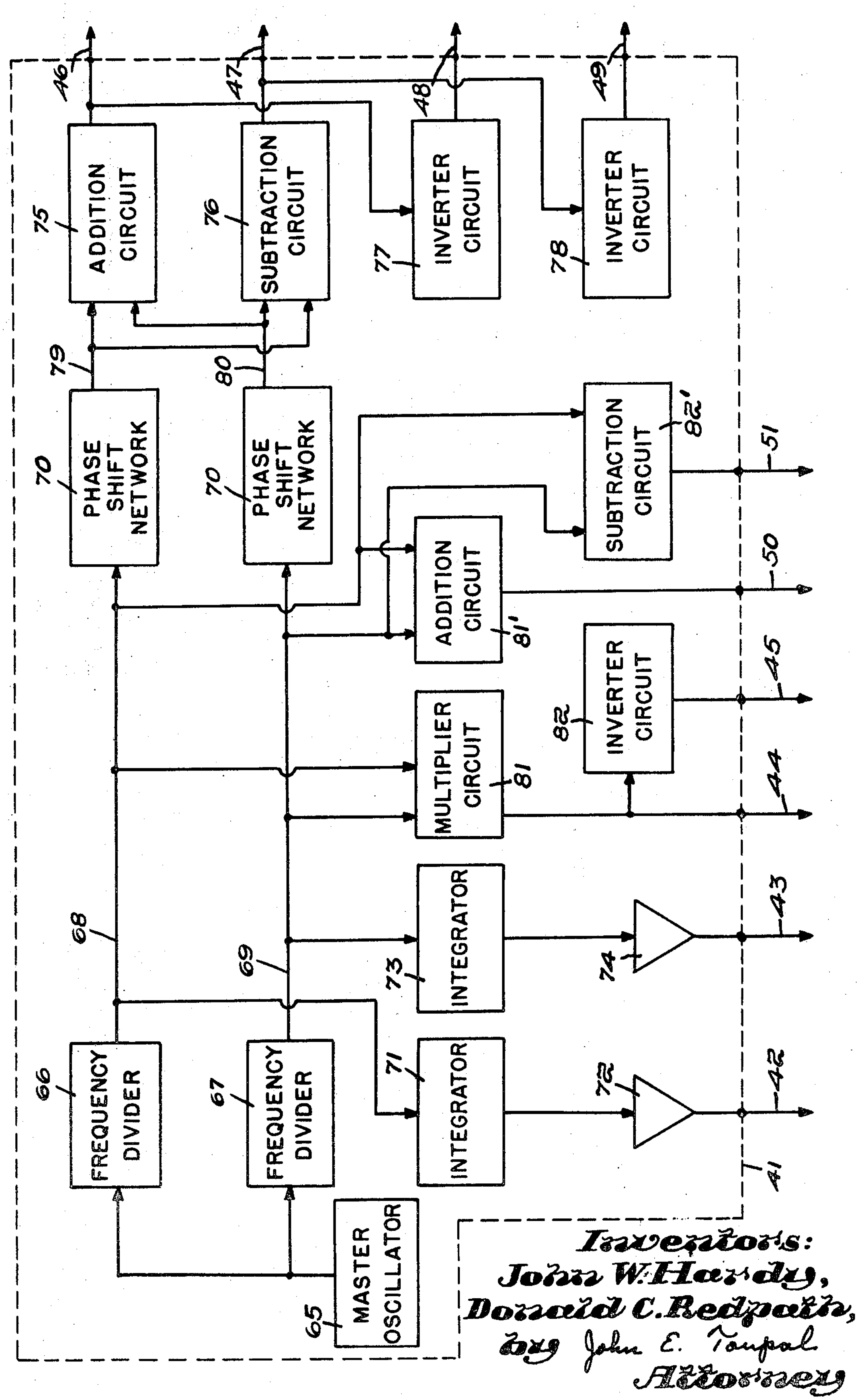
FIG. 2 is a block diagram of the raster generator shown in FIG. 1.

Referring now to FIG. 2 there is shown a schematic block diagram of the raster generator 41. The master oscillator 65 applies a fixed frequency output to both of the frequency divider circuits 66 and 67 which produce square wave reference signals of slightly different frequencies on the output lines 68 and 69. Receiving the reference signals on lines 68 and 69 are the integrator circuits 71 and 73. The outputs of the integrators 71 and 73 are amplified in the amplifiers 72 and 74 producing $x$ and $y$ deflection signals on the lines 42 and 43.

Also receiving and introducing 90° phase shifts in the reference signals on lines 68 and 69 are the phase shift networks 70. The outputs of the phase shift networks 70 are fed on signal lines 79 and 80, respectively, into the addition and subtraction circuits 75 and 76 which produce reference signals on output lines 46 and 47. The inverter circuits 77 and 78 invert the polarities of the output signals 46 and 47 producing complements thereof on the output lines 48 and 49. A deflection blanking signal is provided on the output line 44 by the multiplier circuit 81 which multiplies the reference signals on the lines 68 and 69. This signal is inverted by the inverter circuit 82 producing a complementary blanking signal on line 45. Additional correlation signals are produced on lines 50 and 51 by the addition circuit 81' and subtraction circuit 82' both of which receive the signals on lines 68 and 69.

Figure 3:
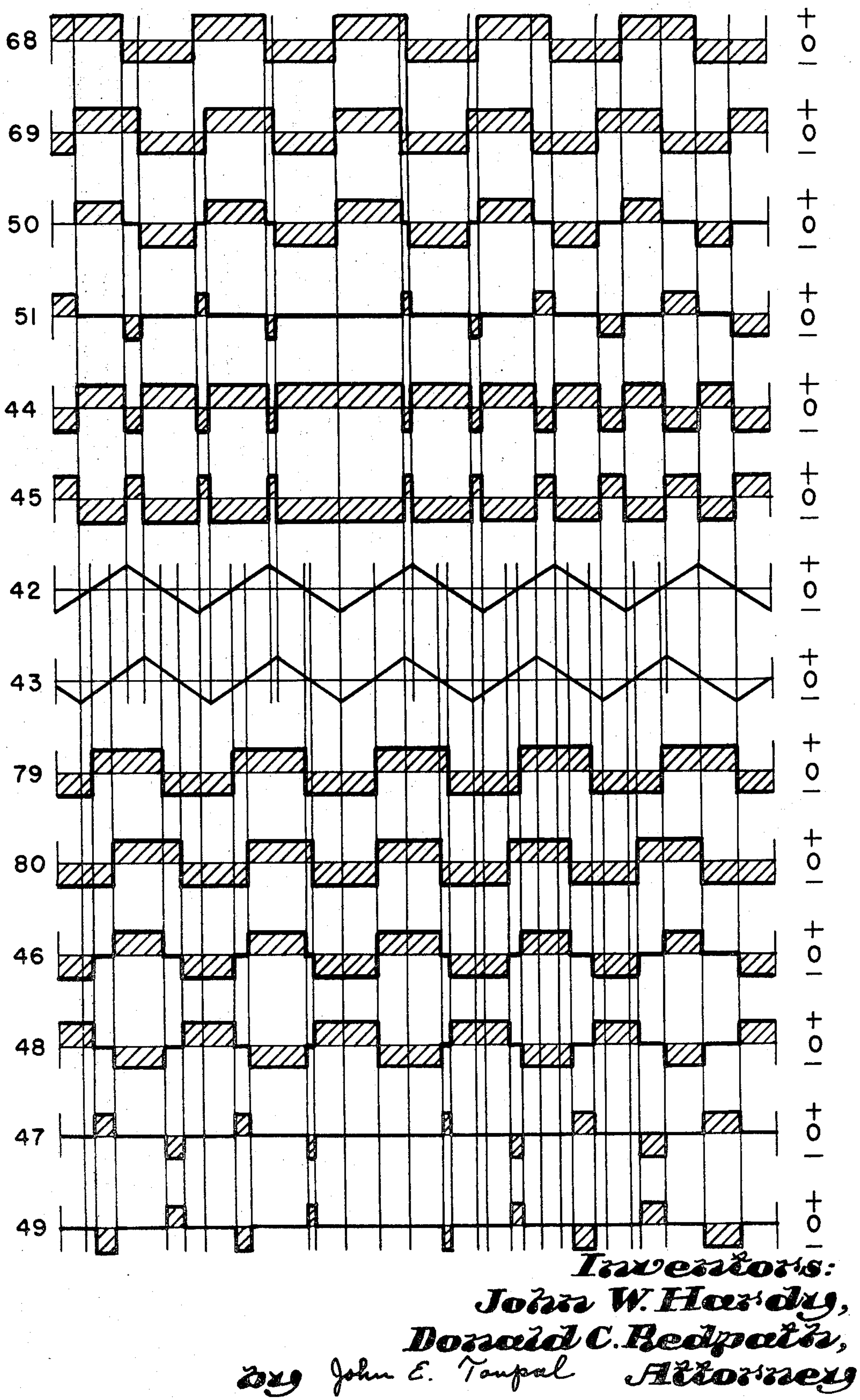
FIG. 3 is a graph showing a plurality of voltage waveforms produced in the raster generator of FIG. 2.

The relationships between the various signals produced in the raster generator 41 are illustrated in FIG. 3 wherein corresponding signal values for the various signal lines are tabulated vertically. As shown, the $x$ and $y$ reference signals on the signal lines 68 and 69 are square waves having slightly different frequencies. Integration of the $x$ and $y$ reference signals produce on lines 42 and 43 triangularly shaped $x$ and $y$ deflection signals which are applied to the deflection coils in each of the vidicon cameras 29, 31, 33 and 34. Multiplication of the $x$ and $y$ reference signals 68 and 69 by the multiplier circuit 81 produces on signal line 44 a blanking signal having a positive polarity when the slopes of deflection signals 42 and 43 agree and a negative polarity when they are opposed. The inverter circuit 82 produces a polarity reversed complementary blanking signal on line 45 having a positive polarity when the slopes of deflection signals 42 and 43 are opposing and a negative polarity when they agree.

Addition of the $x$ and $y$ reference signals produces on line 50 a signal having a positive value when the slopes of both $x$ and $y$ deflection signals are positive and a negative value when both slopes are negative. Conversely, subtraction of these signals produces on line 51 a signal having a positive value when the $x$ and $y$ deflection signal slopes are, respectively, positive and negative; and a negative value when those slopes are, respectively, negative and positive.

The addition circuit 75 adds the phase shifted $x$ and $y$ reference signals on lines 79 and 80 producing on lines 46 a correlation signal having a positive polarity when the $x$ and $y$ deflection signals 42 and 43 are both positive, a negative polarity when the $x$ and $y$ deflection signals are both negative, and zero signal when the $x$ and $y$ deflection signals are of opposite polarity. Conversely, the subtraction circuit 76 subtracts the phase shifted $x$ and $y$ reference signals 79 and 80 producing on output line 47 a correlation signal having a positive polarity during periods wherein the $x$ deflection signal is positive and the $y$ deflection signal is negative, a negative polarity during periods wherein the $x$ deflection signal is negative and the $y$ deflection signal is positive, and a zero signal during periods wherein the $x$ and $y$ deflection signals have the same polarity.

The polarities of the correlation signals on lines 46 and 47 are reversed in the inverter circuits 77 and 78. Thus, the correlation signal on output line 49 has a positive polarity during periods wherein the $x$ deflection signal is negative and the $y$ deflection signal is positive, a negative polarity during periods wherein the $x$ deflection signal is positive and the $y$ deflection signal is negative, and a zero signal during periods of $x$ and $y$ deflection signal polarity agreement. Conversely, the correlation signal on output line 48 has a positive polarity when the $x$ and $y$ deflection signals are both negative, a negative polarity when they are both positive, and zero signal during periods wherein the $x$ and $y$ deflection signals are of opposite polarity.

The $x$ and $y$ deflection signals on lines 42 and 43 are applied to the deflection coils in each of the vidicon cameras 29, 31, 33 and 34. The polarities of these signals establish the positions of the scanning spots on the camera targets and the illustrated triangular waveforms would produce thereon the crossed diagonal or Lissajous-type scan pattern shown in FIG. 4. However, this pattern is modified by the blanking signals on lines 44 and 45 which are effective during their periods of negative polarity to interrupt scanning beam transmission onto the targets of the vidicon cameras. As shown in FIG. 3, the blanking voltage on signal line 44 is negative so as to interrupt scanning beam transmission during intervals wherein the slopes of the $x$ and $y$ deflection signals are of opposite polarity. Thus, there are generated in the vidicon cameras 31 and 33 one scanning pattern having parallel diagonal scanning lines produced only during intervals wherein the slopes of the $x$ and $y$ deflection signals are either both positive or both negative. Such a scanning pattern comprise s parallel diagonal lines inclined upward from left to right with adjacent lines produced by opposite directions of scanning spot movement as illustrated in FIG. 5. Conversely, the blanking signal on line 45 is negative so as to interrupt scanning beam transmission during those periods wherein the slopes of the $x$ and $y$ deflection signals are either both positive or both negative. Therefore, the vidicon cameras 29 and 34 exhibit a different scanning pattern including scanning lines generated only during intervals when the $x$ and $y$ deflection signals have opposite slopes. As illustrated in FIG. 6, this different pattern comprises parallel diagonal lines inclined downward from left to right and with adjacent lines produced by opposite directions of scanning spot movement.

Thus, the video signals on lines 52 and 53 represent, respectively, the light intensity in the first and second identical optical images of the right transparency 23 along the predetermined scanning paths illustrated in FIGS. 6 and 5. The two sets of transversely disposed paths provide a comprehensive representation of image detail retained by the right transparency 23. Similarly, the video signals on lines 54 and 55 represent, respectively, the light intensity in the first and second identical optical images of the left transparency 24 along the related scanning paths also illustrated in FIGS. 6 and 5.

Referring to FIGS. 7 and 7*a*, there are shown schematic diagrams of the comparison circuit 51' which includes the combining network 83 and the analyzing network 84. In the combining network 83, the video signals 52—55 are amplified by the amplifiers 85 and filtered in the identically tuned band pass filter networks 86. Each of the amplified and filtered signals 52 and 53 is passed through a phase shift network 87 which introduces a 45° negative phase shift at the center frequency of the band pass filters 86. The delayed signals on lines 88 and 89 are applied, respectively, to the multiplier circuits 90 and 91. After amplification and filtration, the signals 54 and 55 are fed into the phase shift networks 92 which introduce 45° positive phase shifts at the center frequency of the band pass filters 86. The advanced signals on lines 93 and 94 are also applied, respectively, to the multiplier circuits 90 and 91. The direct current output voltages of the multiplier circuits 90 and 91 on the lines 95 and 96 represent in unanalyzed form the composite parallax error existing in the optical images of the right and left transparencies 23 and 24.

In describing the operation of the combining network 83, one can first consider a situation wherein the scene contents of photographic transparencies 23 and 24 are identical and the images thereof in perfect registration. FIG. 8 shows representative waveforms which would appear on various signal lines of the combining circuit 83 under these conditions. For convenience, the respective waveforms are identified by the numbers applied to the signal lines on which they appear, and are related to each other in a time sense. Since both of the vidicons 29 and 34 produce the same scanning pattern shown in FIG. 6, their video outputs on signal lines 52 and 54 will be identical as shown. However, because of the phase shifts introduced by the phase shift networks 87 and 92, the signals on lines 88 and 93 will be in phase quadrature. Multiplication of these signals in the multiplier circuit 90 produces a square wave output voltage on line 90 having positive and negative periods of equal duration and, therefore, of zero average value. Thus, the assumed condition of exact registration is indicated by a zero output voltage on line 95. It will be obvious without further explanation that a zero output voltage also will be produced on the signal line 96 in an analogous manner.

One can next consider a situation wherein image nonregistration is introduced by shifting the position of the assumed identical transparencies 23 and 24 with respect to each other. In this case the scanning beams of the vidicons 29 and 34 will no longer be simultaneously scanning identical detail in the optical images of the transparencies 23 and 24. Therefore, the video signals on lines 52 and 54 will be time shifted with respect to each other. Ignoring for the moment the changing directions of scan and assuming a direction of image shift such that the video signal on signal line 52 lags slightly behind that on signal line 54, FIG. 9 illustrates waveforms of these signals and of the signals generated thereby on other lines in the combining circuit 83. Again, the various waveforms are identified by their signal line numbers and are related to each other in a time sense. As shown, the signal produced on line 95 is a square wave having negative periods of greater duration than positive periods and therefore of an average negative value. Thus, the misregistration caused by the assumed direction of image shift is indicated by a negative output voltage on the signal line 95. In an analogous manner, there will be produced on line 96 an output voltage indicating relative image shift with respect to the scan directions provided in the vidicons 31 and 33.

Finally, one can consider a condition of image registration caused by a relative shift of the transparencies 23 and 24 in a direction opposite to that assumed above. This would result in a video signal on line 52 which leads the video signal on line 54. Waveforms representing these signals and the signals produced thereby are illustrated in FIG. 10. As shown, the signal produced on output line 95 is a square wave having positive periods of longer duration than negative periods and therefore having an average positive value. Thus, the misregistration caused by an opposite direction of image shift is indicated by a positive output voltage on the output line 95. Again, image shifts in the directions of scan in vidicons 31 and 33 will be similarly indicated on line 96.

As described above, the polarity of the output voltages on lines 95 and 96 is dependent upon the direction of relative shift existing between corresponding detail in the optical images received by the vidicons 29, 31, 33 and 34 and accordingly between the scenes retained by the transparencies 23 and 24. Furthermore, it will be noted that the degree of relative time shift in the video signals and therefore in the assumed relative image shift was greater in the example illustrated by FIG. 10 than in the example illustrated by FIG. 9. It will be further noted that the differences in duration of positive and negative output periods were greater for the example of FIG. 10 than for that in FIG. 9. Thus, in addition to indicating direction of image shift by their polarity, the output voltages on lines 95 and 96 will exhibit magnitudes dependent upon the degree of image shift.

The above description of operation ignored the affect of scan direction upon the sense of relative video signal time shift and accordingly, on the polarities of the output voltages produced on lines 95 and 96. It will be obvious, however, that the sense of video signal shift and output voltage polarity produced thereby exhibit a dependency upon the direction in which the images are being scanned. For example, assuming relative image detail shift in one of the scan directions illustrated in FIG. 5, the video signal produced by the vidicon camera 31 will lag that produced by the vidicon 33 during periods of scan in one direction and will lead during periods of scan in the opposite direction. Thus, the given assumed direction of shift will generate on line 96 an output voltage of alternating polarity which fails to indicate the actual sense of the existing shift. The same situation will exist at output line 95 with respect to relative image detail shift in the scanning directions illustrated in FIG. 6. Therefore, the output signals produced on lines 95 and 96 must be correlated with the instantaneous scanning directions producing the signals if true indications of existing detail shift or parallax error are to be obtained. This correlation occurs in the analyzing circuit 84.

Referring now to FIG. 7, the output signal on line 96 is applied to the multiplier circuit 100 which also receives the correlation signal on line 50. Similarly, the output signal on line 95 is applied to the multiplier circuit 101 which also receives the correlation signal on line 51.

The multiplier circuit 100 provides one parallax signal on signal line 103 and the multiplier circuit 101 produces an additional parallax signal on the signal line 104. These signals are added in the addition circuit 102 and the summation signal is filtered in the low pass filter 104′ producing an $x$ parallax error signal on output line 59. Polarity reversal of the parallax signal on line 104 is produced in the inverter circuit 105 and the resultant signal on line 106 is added to the parallax signal on line 103 in the addition circuit 107. The output of the addition circuit 107 is filtered in the low pass filter 108 producing a $y$ parallax error signal on output line 58.

Also receiving the parallax signal on line 103 are the multiplier circuits 111 and 114 which also receive, respectively, the correlation signals on the lines 47 and 48. Similar multiplier circuits 112 and 113 receive, respectively, the correlation signals on the lines 46 and 49 in addition to the parallax signal on line 104. The output of the multiplier circuit 111 on lines 115 is fed into both the addition circuit 116 and the subtraction circuit 117 which also receive on signal lines 118 the output signal from the multiplier circuit 112. After being filtered in the low pass filter 119, the output signal from the addition circuit 116 provides on output line 56 a magnification error signal. Similarly, the output from the subtraction circuit 117 is filtered in the low pass filter 121 producing on signal line 57 a skew error signal.

The output of the multiplier circuit 113 on signal lines 122 is applied to both the addition circuit 123 and the subtraction circuit 124 which also receive on signal lines 125 the output from the multiplier circuit 114. After being filtered in the low pass filter 126 the output of the addition circuit 123 produces on output line 60 a differential scale error signal. Similarly, the subtraction circuit 124 output is filtered in the low pass filter 127 producing on output line 61 a rotation error signal.

In describing the correlative operation in the analyzing circuit 84, reference will be made to the correlation signal waveforms generated by the raster generator 41 and illustrated in FIG. 3. As shown, the correlation signal on line 50 has a positive value during periods wherein the slopes of the $x$ and $y$ deflection signals 42 and 43 are both positive and a negative value with those slopes are both negative. Thus, multiplication in the multiplier circuit 100 of the output signal 96 by the correlation signal 50 has the effect of reversing the polarity of the output signal 96 only during periods wherein the slopes of $x$ and $y$ deflection signals are both negative. These periods correspond to downward scanning spot movement from right to left. Since the output signal 96 represents relative image detail shift sensed by the scanning pattern illustrated in FIG. 5, this operation produces a parallax error signal on line 103 proportional to relative image detail shift in the directions illustrated in FIG. 11.

The correlation signal on line 51 has, as shown in FIG. 3, a positive value during periods wherein the slope of the $x$ deflection signal 42 is positive and that of the $y$ deflection signal 43 is negative, and a negative value when the slope of the $x$ deflection signal 42 is negative and that of the $y$ deflection signal 43 is positive. Thus, multiplication in the multiplier 101 of the output signal 95 by the correlation signal 51 has the effect of reversing the polarity of the output signal 95 only during periods of simultaneous negative *x* deflection signal slope and positive *y* deflection signal slope. These periods correspond to upward scanning spot movement from right to left. Since the output signal 95 represents relative image detail shift sensed by the scanning pattern shown in FIG. 6, this operation produces a parallax error signal on line 104 proportional to relative image detail shift in the directions illustrated in FIG. 12.

Figure 11:
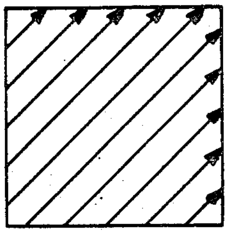
Figure 12:
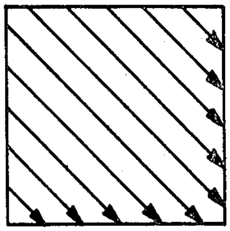

The addition circuit 102 algebraically sums the parallax signals on the lines 103 and 104. As these signals are proportional to relative image shift in opposite vertical directions as shown in FIGS. 11 and 12, any voltage components representing image shift in the vertical or *y* direction will cancel each other. However, both signals 103 and 104 are proportional to shift in the same horizontal direction so that voltage components representing shift in the horizontal or *x* direction will add. Therefore, the averaged output voltage of the low pass filter 104′ on output line 59 will indicate both the magnitude and direction of total *x* parallax error existing between the compared optical images.

Figure 13:
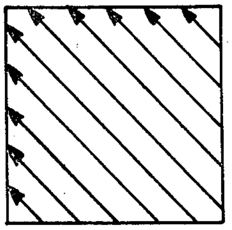
Figure 14:
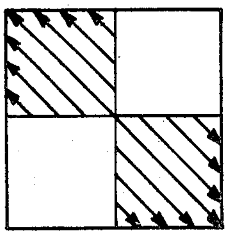
Figure 15:
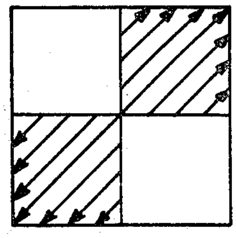

The inverter circuit 105 reverses the polarity of the parallax signal 104 and thereby produces on line 106 a signal proportional to relative image shift in the directions illustrated in FIG. 13. This signal is algebraically added to the parallax signal 103 in the addition circuit 107. Since the signals 103 and 106 are proportional to image shift in opposite horizontal directions, any voltage components representing shift in the horizontal or *x* direction will be cancelled in the addition circuit 107. However, both signals 103 and 106 are proportional to image shift in the same vertical direction so that voltage components representing vertical or *y* direction shift will add. Therefore, the average output of the filter circuit 108 on the output line 58 will indicate both the magnitude and sense of total *y* parallax error existing between the compared scenes.

The multiplier circuit 112 combines the parallax signal 104 with the reference signal 47 which, as shown in FIG. 3, is positive during periods wherein the *x* deflection signal 42 is positive and the *y* deflection signal 43 is negative; is negative during periods wherein the *x* deflection signal 42 is negative and the *y* deflection signal 43 is positive; and has a zero value during periods wherein the *x* and *y* deflection signals 42 and 43 are of the same polarity. Thus, the multiplier circuit 112 passes unaltered those increments of the signal 104 generated during scanning spot movement in the second quadrant portions of the scanning rasters produced in the vidicons 29 and 34, and reverses the polarity of its increments generated during scanning spot movement in the fourth quadrant portions of those rasters. In addition, the multiplier 112 blanks those increments of the parallax signal 104 generated during scanning spot movement in the first and third quadrant portions of the rasters produced in the vidicons 29 and 34. Therefore, the output signal on lines 118 is proportional to relative image shift sensed in the raster portions and directions indicated in FIG. 14.

The multiplier circuit 111 combines the parallax signal 103 with the reference signal 46 which, as shown in FIG. 3, is positive during periods wherein both the *x* and *y* deflection signals 42 and 43 are positive; is negative during periods wherein both the *x* and *y* deflection signals 42 and 43 are negative; and has a zero value during periods wherein the *x* and *y* deflections signals 42 and 43 are of opposite polarity. Thus, the multiplier circuit 111 passes unaltered those increments of the signal 103 generated during scanning spot movement in the first quadrant portions of the scanning rasters produced in the vidicons 31 and 33, and reverses the polarity of its increments generated during scanning spot movement in the third quadrant portions of those rasters. In addition, the multiplier 111 blanks those increments of the parallax signal 103 generated during scanning spot movement in the second and fourth quadrant portions of the rasters produced in the vidicons 31 and 33. Therefore, the output signal on lines 115 is proportional to relative image shifts sensed in the raster portions and directions indicated in FIG. 15.

Addition of the output voltages 115 and 118 in the addition circuit 116 produces a vector error signal proportional to average relative image detail misregistration in directions radially outward from the centers of the scanning rasters. This vector error signal comprises the various error signal components generated during spot movement along the scanning paths indicated in FIG. 16. As shown, the paths in the first and third quadrants are not parallel to those in the second and fourth quadrants but all paths meet the scanning rasters' *x* and *y* axes so as to form obtuse angles with the portions thereof that extend toward the origin. Because of the correlative operation described above, these error signal components correspond to image detail misregistration along those paths in the relative directions indicated, i.e. away from the adjacent *x* and *y* axes in each of the four quadrants. Obviously, such a vector signal represents the average degree of relative magnification distortion existing between the compared optical images. Therefore, the averaged vector output signal of the filter circuit 119 on output line 56 is indicative of the magnitude and sense of magnification error.

Figure 16:
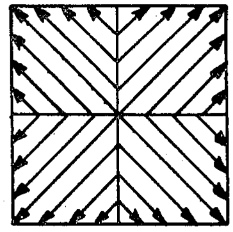
Figure 17:
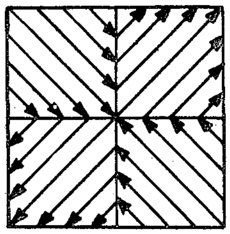
Figure 18:
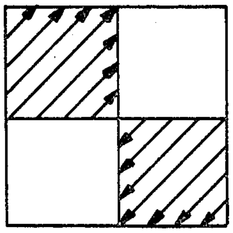
Figure 19:
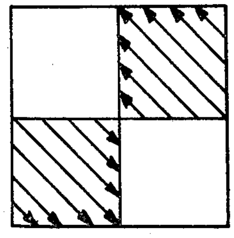

Subtraction of the output voltages 115 and 118 in the subtraction circuit 117 produces a vector error signal also comprising the various error signal components generated during sport spot movement along the scanning paths indicated in FIG. 16. However, as shown in FIG. 17, these error signal components correspond to image detail misregistration along those paths in directions away from the adjacent *x* and *y* axes in the diagonally related first and third quadrants, and toward the adjacent *x* and *y* axes in the diagonally related second and fourth quadrants. Such a vector error signal represents the average degree of relative skew distortion existing between the compared optical images. Therefore, the averaged vector output signal of the filter circuit 121 on line 57 is indicative of the magnitude and sense of skew error.

The multiplier circuit 114 combines the parallax signal 103 with the correlation signal 49 which, as shown in FIG. 3, is positive during periods wherein the *x* deflection signal 42 is negative and the *y* deflection signal 43 is positive; is negative during periods wherein the *x* deflection signal 42 is positive and the *y* deflection signal 43 is negative; and has a zero value during periods wherein the *x* and *y* deflection signals 42 and 43 are of the same polarity. Thus, the multiplier circuit 114 passes unaltered those increments of parallax signal 103 generated during scanning so spot movement in the fourth quadrant portions of the scanning rasters produced in the vidicons 31 and 33, and reverses the polarity of its increments generated during scanning spot movement in the second quadrant portions of those rasters. In addition, the multiplier 114 blanks those increments of the parallax signal 103 generated during scanning spot movement in the first and third quadrant portions of the rasters produced in the vidicons 31 and 33. Therefore, the output signal on lines 125 is proportional to relative image shifts in the raster portions and directions indicated in FIG. 18.

The multiplier circuit 113 combines the parallax signal 104 with the correlation signal 48 which, as shown in FIG. 3, is positive during periods wherein both the *x* and *y* deflection signals 42 and 43 are negative; is negative during periods wherein both *x* and *y* deflection signals 42 and 43 are positive; and has a zero value during periods wherein the *x* and *y* deflection signals 42 and 43 are of opposite polarity. Thus, the multiplier circuit 113 passes unaltered those increments of the signal 104 generated during scanning spot movement in the third quadrant portions of the scanning rasters produced in the vidicons 29 and 34, and reverses the polarity of its increments generated during scanning spot movement in the first quadrant portions of those rasters. In addition, the multiplier circuit 113 blanks those increments of the parallax signal 104 generated during scanning spot movement in the second and fourth quadrant portions of the rasters produced in the vidicons 29 and 34. Therefore, the output signal on lines 122 is proportional to relative image shift sensed in the raster portions and directions indicated in FIG. 19.

Subtraction of the output voltages 122 and 125 in the subtraction circuit 124 produces a vector error signal representing relative image detail misregistration between the compared images in common directions of rotation about the centers of the scanning rasters. This vector error signal comprises the various error signal components generated during spot movement along the paths indicated in FIG. 20. As shown, the paths in the first and third quadrants are not parallel to those in the second and fourth quadrants but all paths meet the scanning rasters' $x$ and $y$ axes so as to form acute angles with the portions thereof that extend toward the origin. Because of the correlative operations described above, these error signal components correspond to image detail misregistration along those paths in the relative directions indicated, i.e. toward the adjacent $x$ axis in the diagonally related first and third quadrants, and toward the adjacent $y$ axis in the diagonally related second and fourth quadrants. Obviously, this vector signal represents the average degree of relative rotation distortion existing between the compared optical images. Therefore, the averaged vector output signal of the filter circuit 127 on output i line 61 is indicative of the magnitude and sense of rotation error.

Figure 20:
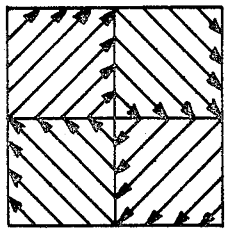
Figure 21:
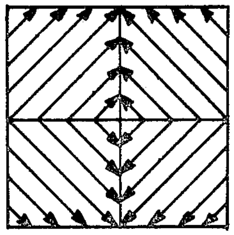

Addition of the output voltages 122 and 125 in the addition circuit 123 produces a vector error signal comprising error signal components also generated during spot movement along the paths shown in FIG. 20. However, as indicated in FIG. 21, these error signal components correspond to relative image detail misregistration in directions toward the adjacent $y$ axis in all four quadrants. Such a vector error signal represents the average relative differential scale distortion existing between the compared optical images. Therefore, the averaged vector output signal of the filter circuit 126 on output line 60 is indicative of the magnitude and sense of differential scale error.

The signals on lines 58 and 59 are applied to the transport table 21 and are effective to produce relative movement between the right transparency 23 and the left transparency 24. The relative positions of the transparencies 23 and 24 are shifted to a degree and sense determined by the magnitude and polarities of the voltages on the signal lines 58 and 59. In this way the $x$ and $y$ parallax errors sensed by the analyzer circuit 84 are eliminated. The specific structural characteristics of the optical assembly 26 and of the transport table 21 do not form a part of the present invention and are therefore not described in detail. However, U.S. Pat. Nos. 2,975,670 and 3,101,645 disclose optical systems suitable for this purpose and a suitable transport mechanism is fully described in the above noted U.S. application Ser. No. 394,502, "Photographic Image Registration, " filed Sept. 4, 1964 and assigned to the assignee of the present invention.

The signals on lines 56, 57, 60 and 61 are applied to the optical assembly 26 of FIG. 1. As shown in FIG. 22, the assembly 26 comprises the zoom lens 140 which transmits the optical image from the right transparency 23 to the image rotator 145. Controlling the zoom lens 140 and the rotator 145 are the servomotors 142 and 147 which receive from the analyzing circuit 84, respectively, the signals on lines 56 and 61. Also included in the optical assembly 26 is the anamorphic corrector lens 141 which relays the optical image received from the image rotator 145 to the second anamorphic corrector lens 144. Automatically controlling the anamorphic lenses 141 and 144 are the servomotors 143 and 146 which receive from the analyzing circuit 84, respectively, the signals on lines 57 and 60. Finally, the beam splitter 148 divides the image received from the anamorphic lens 144 into identical optical images which are transmitted to the binocular viewer (not shown) and to the optical system 28.

As controlled by the servomotor 142, the zoom lens 140 varies the magnification of the right optical image to a degree and sense determined by the magnitude and polarity of the voltage on the signal line 56. In this way the relative magnification error sensed in the analyzer circuit 84 is corrected.

Similarly, the rotator lens 145 is driven by the servomotor 147 to produce rotation of the optical image from the right transparency 23 to a degree and sense determined by the magnitude and polarity of the voltage on the signal line 61. This image rotation eliminates the relative rotation error sensed in the analyzer circuit 84. Finally, under control of the servomotors 143 and 146 the anamorphic corrector lenses 141 and 144 produce image transformations of a degree and sense determined by the magnitudes and polarities of the voltages on signal lines 57 and 60. These transformations are such as to eliminate the relative skew and differential scale errors sensed by the analyzer circuit 84.

It will be obvious that any parallax or distortion correction required in the optical images produced by the transparencies 23 and 24 is relative. Thus, the vector error signals on lines 56, 57, 60 and 61 also can be applied to lens elements in the optical assembly 27 which is identical to that shown in FIG. 22, the only change necessary being a reversal of the polarity of each signal. In addition, it can be desirable in some applications to apply the signals on lines 56, 57, 60 and 61 to both of the optical assemblies 26 and 27. In this case, the signals effect optical corrections of an opposite sense in the two optical assemblies 26 and 27 thereby producing the desired image registration.

As described, the image correlator according to the present invention produces automatic registration of optical images formed from stereophotographs. Registration is efficiently obtained by producing unique vector error signals suitable for automatically controlling corrective optical elements. Also the relatively high light sensitivity exhibited by the image storing vidicon cameras permits use of the invention in applications for which other systems are unsuitable. Furthermore, the use of vidicon tubes allows the use of a common light source for both image analysis and viewing. This substantially simplified simplifies the optical requirements of the system.

Another important feature of the invention is the use of a pair of vidicon cameras for observing each of the compared images. This permits each of the compared images to be examined with an extremely comprehensive scanning pattern while eliminating scanning line crossovers in individual cameras. Since scanning line crossovers cause nonuniform exposure periods and thereby introduce undesirable frequency components in the produced video outputs, their elimination is of substantial importance.

FIG. 23 is a schematic block diagram of another embodiment of the invention in which the vidicon cameras 29', 32', 33' and 34' are adapted to receive identical pairs of optical images in the same manner illustrated for the cameras 29, 31, 33 and 34 in FIG. 1. The video signals produced by the vidicons are applied to the combining circuit 83' which also is identical to the circuit 83 shown in FIG. 7. However, the raster generator 141 and analyzer circuit 142 are modified with respect to the raster generator 41 and analyzer circuit 84 described above.

The raster generator 141 produces on line 143 one deflection signal which is applied to the $x$ deflection coils of the vidicon cameras 32' and 33' and to the $y$ deflection coils of the vidicon cameras 29' and 34'. A second deflection signal on line 144 is applied to the $x$ deflection coils of vidicon cameras 29' and 34' and to the $y$ deflection coils of vidicons 32 and 33' . Also produced by the raster generator 141 on output lines 145 and 146 are correlation signals which are phase shifted with respect to the deflection signals on lines 143 and 144.

FIG. 24 illustrates in block form the principle components of the raster generator 141. The fixed frequency output of the master oscillator 147 provides a square wave correlation signal on line 145. The oscillator output also is applied to the sawtooth wave generator 148 which produces a deflection signal on line 143. Division of the reference signal on line 145 in the divider circuit 149 produces an additional correlation signal on line 146. This signal is applied to the sawtooth wave generator 151 which provides a second deflection signal on line 144. Waveforms representing the signal relationships in the raster generator 141 are illustrated in FIG. 25 wherein waveforms are identified by the numbers of the signal lines on which they appear. The various waveforms are tabulated vertically and are related in a time sense.

The application of the deflection signals 143 and 144 to the vidicon cameras 32′ and 33′ produces therein one scanning pattern of the form illustrated in FIG. 26. Conversely, the application of the same signals 143 and 144 to alternate deflection coils of the vidicon cameras 29′ and 34′ produce therein the different scanning pattern shown in FIG. 27. Thus, the output signal from the combining circuit 83′ on output line 161 represents relative image detail shift in the horizontal, left to right directions indicated by FIG. 26. Similarly, the combining circuit 83′ output on output line 162 represents relative image detail shift in the vertically upward directions indicated by FIG. 27.

The output signals 161 and 162 are analyzed with respect to the correlation signals 145 and 146 in the analyzer circuit 142 producing on lines 164—167 error signals corresponding to various types of image detail misregistration. Included in the analyzer circuit 142 is the multiplier circuit 171 which multiplies the output signal 161 and the correlation signal 145. This operation reverses the polarity of those increments of the output signal 161 generated during spot movement in one of the horizontal halves of the scanning patterns illustrated in FIG. 26. The resultant output signal represents relative image detail shift in the directions indicated by FIG. 28. Therefore, the averaged output of the low pass filter circuit 172 on output line 164 indicates both magnitude and sense of existing $x$ scale error.

Since the output signal 161 represents relative image detail shift in only one horizontal direction as shown in FIG. 26, it provides an averaged output from the low pass filter circuit 173 on line 165 indicating both the magnitude and sense of existing $x$ parallax error. Similarly, the output signal 162 represents relative image detail shift in only one vertical direction as shown by FIG. 27. Thus, after being averaged in the low pass filter circuit 174, the output voltage on line 168 indicates both magnitude and sense of existing $y$ parallax error.

The analyzer circuit circuit 142 also includes the multiplier circuit 175 which multiplies the output signal 161 and the correlation signal 146. This operation reverses the polarity of those increments of the signal 161 generated during spot movements in one of the vertical halves of the scanning patterns shown in FIG. 26. The resultant output signal represents relative image detail shift in the directions indicated by FIG. 29. Therefore, the averaged output of the low pass filter circuit 176 on output line 166 indicates both the magnitude and sense of existing $x$ skew error.

The multiplier circuit 177 multiplies the output signal 162 and the correlation signal 146. This reverses the polarity of those increments of the signal 162 generated during spot movement in one of the horizontal halves of the scanning patterns shown in FIG. 27. The resultant output of the multiplier 177 represents relative image detail shift in the directions indicated by FIG. 30. Therefore, the averaged output of the low pass filter circuit 178 on output line 167 indicates both magnitude and sense of existing $y$ skew error.

An additional multiplier circuit 181 multiplies the output signal 162 and the correlation signal 145. This operation reverses the polarity of those increments of the output signal 162 generated during spot movement in one of the vertical halves of the scanning patterns shown in FIG. 27. The resultant output signal represents relative image detail shift in the direction indicated by FIG. 31. Therefore, the averaged output of the low pass filter 182 on output line 169 indicates both the magnitude and sense of existing $y$ scale error.

The embodiment of FIG. 23 is similar to that shown in FIG. 1 in that both provide comprehensive image scans without undesirable scanning line crossovers. In addition, the latter embodiment has the advantage that the $x$ and $y$ components of image parallax can be directly extracted from the analyzer circuit without the requirement for correlation. This leads to a reduced noise level in the analyzer output. However, the error signals produced by this embodiment are the conventional type rather than the unique lens correcting tp type provided by the embodiment of FIG. 1.

Obviously, many modifications and variations of the present invention are possible in light of the above teachings. For example, although the described vidicon camera tube systems exhibit certain special characteristics, the unique combination error signals produced in the FIG. 1 embodiment could be obtained in systems using other types of cameras tubes; e.g. cathode ray flying spot scanner tubes, dissector tubes, etc.; which convert a two-dimensional optical image into a time varying electrical signal. It is, therefore, to be understood that within the scope of the appended claims the invention can be practiced otherwise than as specifically described.

We claim:

1. A system for determining misregistration between homologous detail in a pair of objects and comprising signal generating means for producing one video signal representing variable detail along a given path in one of said objects and an additional video signal representing variable detail along a similar path in the other of said objects, a comparison circuit for comparing said one and said additional video signals and adapted to produce parallax error signals indicating misregistration between common detail along said given and similar paths, and said comparison circuit comprising analyzer circuit means adapted to analyze said parallax error signals and to produce therefrom a vector error signal comprising error signal components representing relative detail misregistration between said objects along nonparallel paths in each of said objects.

2. A system according to claim 1 including adjustable means associated with said objects and controlled by said vector error signal to reduce the extent of detail misregistration represented thereby.

3. A system according to claim 1 wherein said vector error signal comprises a magnification error signal representing the average degree of relative detail misregistration between said objects in radial directions away from common points therein.

4. A system according to claim 1 wherein said vector error signal comprises a rotation error signal representing the average degree of relative image detail misregistration between said objects in uniform directions of rotation about common points therein.

5. A system according to claim 1 wherein said nonparallel paths terminate on Cartesian coordinate axes in each of said objects.

6. A system according to claim 5 wherein said axes are rectilinear and said nonparallel paths in each of said objects comprise paths that meet said axes so as to form obtuse angles with the portions of said axes that extend toward the origin of said coordinates.

7. A system according to claim 6 wherein said vector error signal comprises a skew error signal representing the average degree and sense of relative detail misregistration along said obtusely angled paths in directions away from the adjacent axes in one set of diagonal quadrants of the Cartesian system, and in directions toward the adjacent axes in the other set of diagonal quadrants thereof.

8. A system according to claim 6 wherein said vector error signal comprises a magnification error signal representing the average degree and sense of relative detail misregistration along si said obtusely angled paths in directions away from the adjacent axes in all quadrants of the Cartesian system.

9. A system according to claim 5 wherein said axes are rectilinear and said nonparallel paths in each of said objects comprise paths that meet said axes so as to form acute angles with the portions of said axes that extend toward the origin of said coordinates.

10. A system according to claim 9 wherein said vector error signal comprises a differential scale error signal representing the average degree and sense of relative detail misregistration along said acutely angled paths in directions toward the same coordinate axis in all quadrants of the Cartesian system.

11. A system according to claim 9 wherein said vector error signal comprises a rotation error signal representing the average degree and sense of relative detail misregistration in directions toward one coordinate axis along the acutely angled paths in one set of diagonal quadrants of the Cartesian system, and in directions toward the other coordinate axis along the acutely angled paths in the other set of diagonal quadrants thereof.

12. A system according to claim 5 wherein said axes are rectilinear and said analyzer circuit means is adapted to produce a plurality of vector error signals each comprising error signal components representing relative detail misregistration between said objects along nonparallel paths therein and said nonparallel paths comprise some paths that meet said axes a so as to form obtuse angles with the portions of said axes ta that extend toward the origin of said coordinates and other paths that meet said axes so as to form acute angles with the portions of said axes that extend toward the origin.

13. A system according to claim 12 wherein said vector error signals comprise a magnification error signal representing the average degree and sense of relative detail misregistration along said obtusely angled paths in directions away from the adjacent axes in all quadrants of the Cartesian system, and a rotation error signal representing the average degree and sense of relative detail misregistration in directions toward one coordinate axis along the acutely angled paths in one set of diagonal quadrants of the Cartesian system, and in directions toward the other coordinate axis along the acutely angles paths in the other set of diagonal quadrants thereof.

14. A system according to claim 13 wherein said signal generating means comprise image producing means for producing optical images of said objects and said video signals represent image detail along paths in said optical images, said image producing means comprising an adjustable magnification lens means controlled by said magnification error signal to reduce the extent of image detail misregistration error signal to reduce the et extent of image detail misregistration in said optical images, said image producing means further comprising an image rotator means controlled by said rotation error signal to reduce the extent of image detail misregistration in said optical images.

15. A system according to claim 13 wherein said vector error signals further comprise a skew error signal representing the average degree and sense of relative detail misregistration along said obtusely angled paths in directions away from the adjacent axes in one set of diagonal quadrants of the Cartesian system, and in directions toward the adjacent axes in the other set of diagonal quadrants thereof; and a differential scale error signal representing the average degree and sense of relative detail misregistration along said acutely angled paths in directions toward the same coordinate axis o in all quadrants of the Cartesian system.

16. A system according to claim 15 wherein said signal generating means comprises image producing means for producing optical images of said objects and said video signals represent image detail along paths in said optical images, said image producing means comprising adjustable optical means controlled by said vector error signals to reduce the extent of image detail misregistration in said optical images.

17. A system according to claim 1 wherein said signal generating means comprises camera tube means for scanning the detail along said given and similar paths and raster generator means for providing scanning beam df deflection signals for said camera adjustable means, sa controlled said analyzer circuit means is adapted to core correlate said parallax error signals with said deflection signals so as to produce said vector error signals.

18. A system according to claim 17 wherein said signal generating means comprises image producing means for producing optical images of said objects and said video signals represent image detail along paths in said optical images, said image producing means comprising adjustable optical means controlled by said vector error signal to reduce the extent of m image detail misregistration in said optical images.

19. A system according to claim 17 wherein said vector error signal comprises a magnification error signal representing the average degree of relative detail misregistration between said objects in radial directions away from common points therein.

20. A system according to claim 17 wherein said vector error signal comprises a rotation error signal representing the average degree of relative misregistration between said objects in uniform directions of rotation about common points therein.

21. A system according to claim 17 wherein said nonparallel paths terminate on Cartesian coordinate axes in each of said objects.

22. A system according to claim 21 wherein said axes are rectilinear and said nonparallel paths in each of said objects comprise paths that meet said axes so as to form obtuse angles with the portions of said axes that extend toward the origin of said coordinates.

23. A system according to claim 22 wherein said vector error signal comprises a skew error signal representing the average degree and sense of relative detail misregistration along said obtusely angled paths in directions away from the adjacent axes in one set of diagonal quadrants of the Cartesian system, and in directions toward the adjacent axes in the other set of diagonal quadrants thereof.

24. A system according to claim 22 wherein said vector error signal comprises a magnification error signal representing the average degree and sense of relative detail misregistration along said obtusely angled paths in directions away from the adjacent axes in all quadrants of the Cartesian system.

25. A system according to claim 22 wherein said axes are rectilinear and said nonparallel paths in each of said objects comprise paths that meet said axes so as to form acute angles with the portions of said axes that extend toward the origin of said coordinates.

26. A system according to claim 25 wherein said vector error signal comprises a differential scale error signal representing the average degree and sense of relative detail misregistration along said acutely angled paths in directions toward the same coordinate axis in all quadrants of the Cartesian system.

27. A system according to claim 25 wherein said vector error signal comprises a rotation error signal representing the average degree and sense of relative image detail misregistration in directions toward one coordinate axis along the acutely angled paths in one set of diagonal quadrants of the Cartesian system, and in directions toward the other coordinate axis along the acutely angled paths in the other set of diagonal quadrants thereof.

28. A system according to claim 17 wherein said axes are rectilinear and said analyzer circuit means is adapted to produce a plurality of error signals each comprising error signal components representing relative detail misregistration between said objects along nonparallel paths therein and said nonparallel paths comprise some paths that meet said axes so as to form obtuse angles with the portions of said axes that extend toward the origin of said coordinates and other paths that meet said axes so as to form acute angles with the portions of said axes that extend toward the origin.

29. A system according to claim 28 wherein said vector error signals comprise a magnification error signal representing the average degree and sense of relative detail misregistration along said obtusely angled paths in directions away from the adjacent axes in all quadrants of the Cartesian system, and a rotation error signal representing the average degree and sense of relative detail misregistration in directions toward one coordinate axis along the acutely angled paths in one set of diagonal quadrants of the Cartesian system, and in directions toward the other coordinate axis along the acutely angled paths in the other set of diagonal quadrants thereof.

30. A system according to claim 29 wherein said signal generating means comprise image producing means for producing optical images of said objects and said video signals represent image detail along paths in said optical images, said image producing means comprising an adjustable magnification lens means controlled by said magnification error signal to reduce the extent of image detail misregistration in said optical images, said image producing means further comprising an image rotator means controlled by said rotation error signal to reduce the extent of image detail misregistration in said optical images.

31. A system according to claim 29 wherein said vector error signals further comprise a skew error signal representing the average degree and sense of relative detail misregistration along said obtusely angled paths in directions away from the adjacent axes in one set of diagonal quadrants of the Cartesian system, and in directions toward the adjacent axes in the other set of diagonal quadrants thereof; and a differential scale error signal representing the average degree and sense of relative detail misregistration along said acutely angled paths in directions toward the same coordinate axis in all quadrants of the Cartesian system.

32. A system according to claim 31 wherein said signal generating means comprises image producing means for producing optical images of said objects and said video signals represent image detail along paths in said optical images, said image producing means comprising adjustable optical means controlled by said vector error signals to reduce the extent of image detail misregistration in said optical images.

33. An image comparison system comprising one optical system adapted to produce first and second identical optical images of one object, an additional optical system adapted to produce first and second identical optical images of an additional object, one pair of image storing electronic cameras adapted to receive said first and second optical images produced by said one optical system, an additional pair of image storing electronic cameras adapted to receive said first and second optical images produced by said additional optical system, said one pair of electronic cameras adapted to produce first and second video signals representing the radiation level in scanned portions of said first and second images produced by said one optical system, said additional pair of electronic cameras adapted to produce first and second video signals representing the radiation level in scanned portions of said first and second images produced by said additional optical system, and comparison circuit means for comparing said first video signals and producing one output signal indicative of nonuniformities in said scanned portions of said first optical images and comparing said second video signals and producing an additional output signal indicative of nonuniformities in said scanned portions of said second optical images.

34. An image comparison system according to claim 33 wherein said raster generator provides one scanning pattern for said electronic cameras receiving said first optical images and a different scanning pattern for said electronic cameras receiving said second optical images, and both said one and said different scanning patterns are formed by nonintersecting scanning lines.

35. An image comparison system according to claim 34 wherein said nonintersecting scanning lines are substantially parallel and the lines in said one pattern scan optical image portions which are substantially transversely related to the portions scanned by lines in said different pattern.

36. An image comparison system according to claim 35 wherein said one output signal produced by said comparison means indicates both the magnitude and sense of phase shift existing between said first video signals, and said additional output signal produced by said comparison means indicates both the magnitude and sense of phase shift existing between said second video signals.

37. An image comparison system according to claim 36 wherein said scanning lines in both said one and said different scanning pattern comprise diagonal scanning lines which scan in opposite directions.

38. An image comparison system according to claim 37 wherein said comparison means comprises primary correlator means adapted to invert the sense of said one output signal during periods wherein the scanning lines in said one scanning pattern scan in one of said opposite directions thereby providing one parallax signal and to invert the sense of said additional output signal during periods wherein the scanning lines in said different scanning pattern scan in one of said opposite directions thereby providing an additional parallax signal.

39. An image comparison system according to claim 38 wherein said comparison means comprises $x$ parallax correlator means for combining said one and said additional parallax signals to provide an $x$ parallax error signal, and a $y$ parallax correlator means which inverts the sense of either said one or said additional parallax signals and combines the inverted signal with the other parallax signal to provide a $y$ parallax error signal.

40. An image comparison system according to claim 38 wherein said comparison means comprises scale correlation means which inverts the sense of said one parallax signal during periods wherein the scanning beams producing said one scanning pattern are in either the first or third quadrant portions of a rectilinear Cartesian coordinate-type scan, blocks said one parallax signal during periods wherein the scanning beams producing said one scanning pattern are in the second and fourth quadrant portions thereof, inverts the sense of said additional parallax signal during periods wherein the scanning beams producing said different scanning pattern are in either the second or fourth quadrant portions thereof, blocks said additional parallax signal during periods wherein the scanning beams producing said different scanning pattern are in the first and third quadrant portions thereof, and combines the thereby altered said one and said additional parallax signals.

41. An image comparison system according to claim 40 wherein said comparison means comprises skew correlation means which inverts the sense of said one parallax signal during periods wherein the scanning beams producing said one scanning pattern are in either the second or fourth quadrant portions thereof, blocks said one parallax signal during periods wherein the scanning beams producing said one scanning pattern are in the first and third quadrant portions thereof, inverts the sense of said additional parallax signal during periods wherein the scanning beams producing said different scanning pattern are in either the first or third quadrant portions thereof, blocks said additional parallax signal during periods wherein the scanning beams producing said different scanning pattern are in the second and fourth quadrant portions thereof, and combines the thereby altered said one and said additional parallax signals.

42. An image comparison system according to claim 37 wherein said raster generator produces reference signals adapted to provide crossed diagonal raster patterns for said cameras, and including one blanking circuit means connected to said cameras receiving said first optical images and adapted to blank those portions of said reference signals which would produce scanning lines in one diagonal direction, and an additional blanking circuit means connected to said cameras receiving said second optical images and adapted to blank those portions of said reference signals which would produce scanning lines in the other diagonal direction.

43. An image comparison system according to claim 42 wherein said comparison means comprises primary correlator means adapted to invert the sense of said one output signal during periods wherein the scanning lines in said one scanning pattern scan in one of said opposite directions thereby providing one parallax signal, and to invert the sense of said additional output signal during periods wherein the scanning lines in said different scanning pattern scan in one of said opposite directions thereby providing an additional parallax signal.

44. An image comparison system according to claim 43 wherein said comparison means comprises $x$ parallax correlator means for combining said one and said additional parallax signals to provide an $x$ parallax error signal, and $y$ parallax correlator means which inverts the sense of either said one or said additional parallax signals and combines the inverted signal with the other parallax signal to provide a $y$ parallax error signal.

45. An image comparison system according to claim 43 wherein said comparison means comprises scale correlation means which inverts the sense of said one parallax signal during periods wherein the scanning beams producing said one scanning pattern are in either the first or third quadrant portions of a rectilinear Cartesian coordinate-type scan, blocks said one parallax signal during periods wherein the scanning beams producing said one scanning pattern are in the second and fourth quadrant portions thereof, inverts the sense of said additional parallax signal during periods wherein the scanning beams producing said different scanning pattern are in either the second or fourth quadrant portions thereof, blocks said additional parallax signals during periods wherein the scanning beams producing said different scanning pattern are in the first and third quadrant portions thereof, and combines the thereby altered said one and said additional parallax signals.

46. An image comparison system according to claim 45 wherein said comparison means comprises skew correlation means which inverts the sense of said one parallax signal during periods wherein the scanning beams producing said one scanning pattern are in either the second or fourth quadrant portions thereof, blocks said one parallax signal during periods wherein the scanning beams producing said one scanning pattern are in the first and third quadrant portions thereof, inverts the sense of said additional parallax signal during periods wherein the scanning beams producing said different scanning pattern are in either the first or third quadrant portions thereof, blocks said additional parallax signal during periods wherein the scanning beams producing said different scanning pattern are in the second and fourth quadrant portions thereof, and combines the thereby altered said one and said additional parallax signals.

47. An image comparison system according to claim 36 wherein said one scanning pattern is formed by substantially horizontal scanning lines having a single common direction of scan and said additional scanning pattern is formed by substantially vertical scanning lines having a single common direction of scan.

48. An image comparison system according to claim 47 wherein said comparison means comprises $x$ scale correlation means which inverts the sense of said one output signal only during periods wherein the scanning beams producing said one scanning pattern are in one of the horizontal halves thereof.

49. An image comparison system according to claim 47 wherein said comparison means comprises $x$ skew correlator means which inverts the sense of said one output signal only during periods wherein the scanning beams producing said one scanning pattern are in one of the vertical halves thereof.

50. An image comparison system according to claim 47 wherein said comparison means comprises $y$ scale correlator means which inverts the sense of said additional output signal only during periods wherein the scanning beams producing said different scanning pattern are in one of the vertical halves thereof.

51. An image comparison system according to claim 47 wherein said comparison means comprises $y$ skew correlation means which inverts the sense of said additional output signal only during periods wherein the scanning beams producing said different scanning pattern are in one of the horizontal halves thereof.